Jan. 12, 1943.  A. E. W. JOHNSON ET AL  2,308,368
IMPLEMENT HITCH
Filed June 6, 1941  2 Sheets-Sheet 1
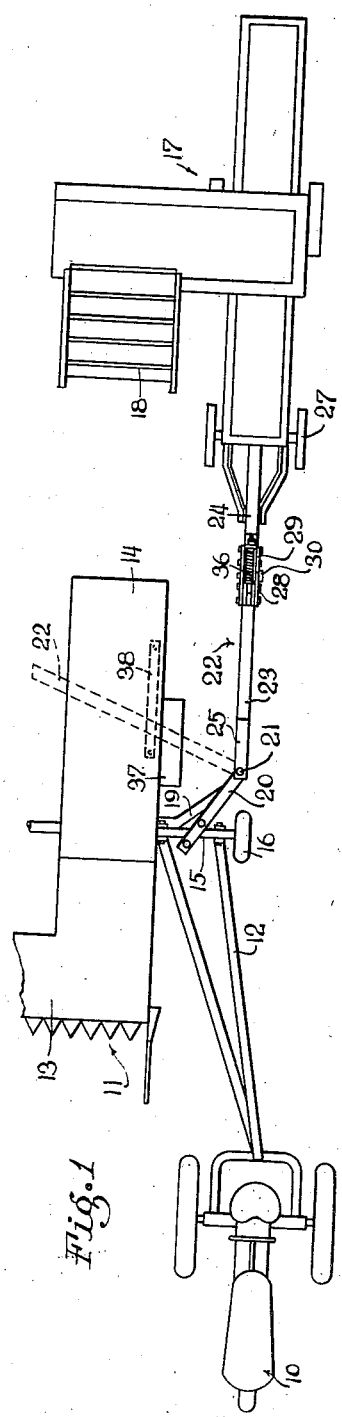
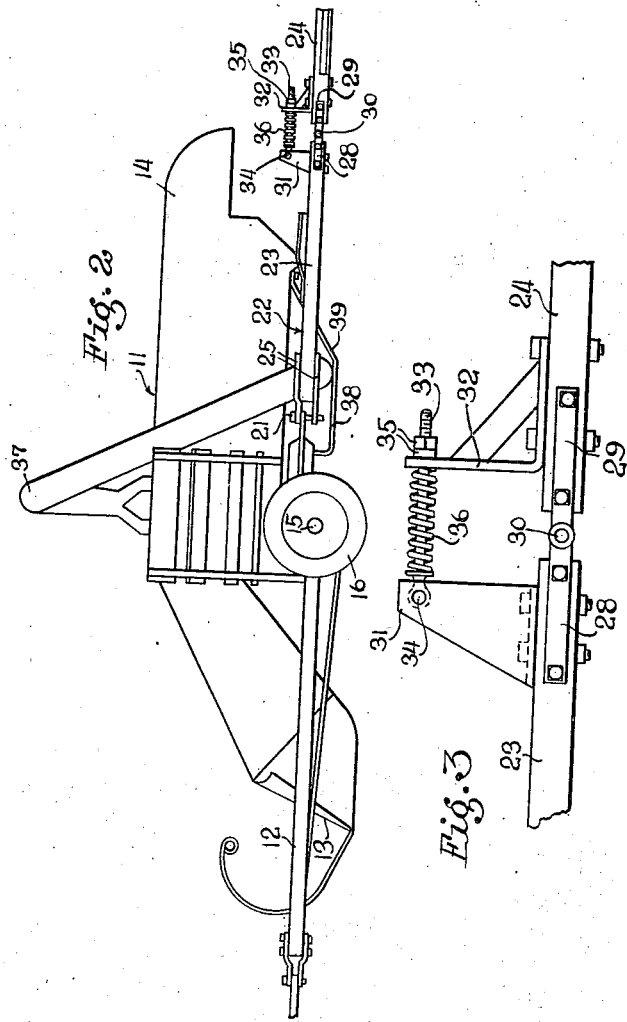
Inventors
Arnold F. W. Johnson
Charles F. Cruml Sr.
By Paul O Pippel
Atty.

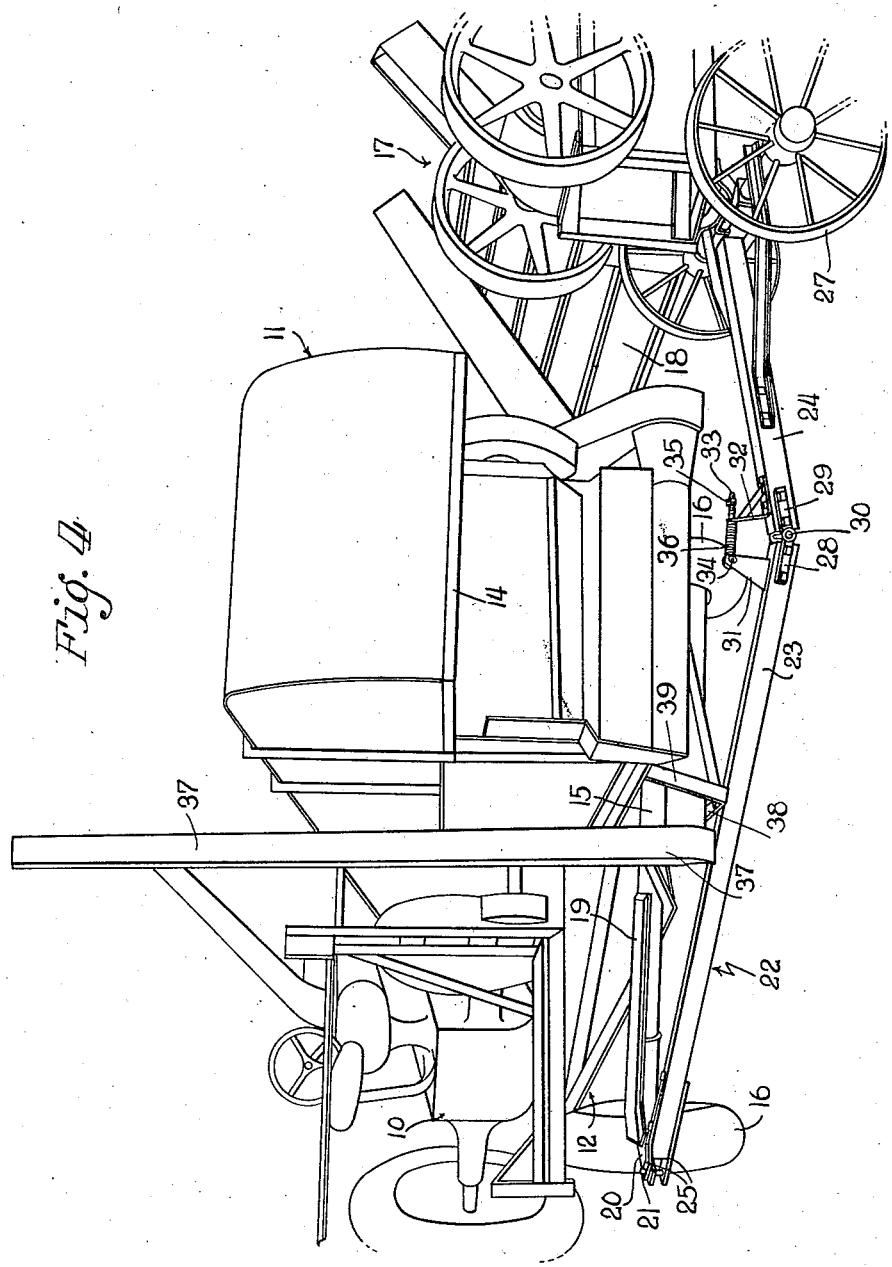

Patented Jan. 12, 1943

2,308,368

UNITED STATES PATENT OFFICE 2,308,368

IMPLEMENT HITCH

Arnold E. W. Johnson, Oak Park, and Charles F. Crumb, Sr., Clarendon Hills, Ill., assignors to International Harvester Company, a corporation of New Jersey Application June 6, 1941, Serial No. 396,896

8 Claims. (Cl. 56—10)

This invention relates to an implement hitch. More specifically, it relates to a hitch for connecting a pick-up baler behind a harvester thresher.

The design of a hitch which is to connect a pick-up baler behind a harvester thresher presents some difficulties in view of the fact that the hitch proper must be connected to the harvester thresher in the vicinity of the axle of the harvester thresher and must be capable of clearing the structure of the harvester thresher which is to one side of the axle when the harvester thresher and pick-up baler are in tuning position.

An object of the present invention is to provide an improved implement hitch.

A further object is the provision of a hitch for connecting a pick-up baler behind a harvester thresher.

According to the present invention, a pick-up baler is connected behind a harvester thresher by means of a hitch which is composed of two sections pivotally connected in longitudinal alignment with one another for relative movement in a vertical plane and having attached thereto means which prevent upward movement of the pivot point and resist downward movement of the pivot point. During turning of the harvester thresher and pick-up baler, the sections of the hitch pass beneath the rear portion of the harvester thresher, this being possible because of the pivotal connection of the sections.

In the drawings:

Figure 1 is a plan view of a harvester thresher and pick-up baler connected at the rear thereof;

Figure 2 is a side view of some of the parts shown in Figure 1;

Figure 3 is a detail view of a portion of the novel hitch for connecting the pick-up baler to the harvester thresher; and Figure 4 is a perspective view showing the action of the hitch when the pick-up baler and harvester thresher are being turned.

Reference character 10 denotes a conventional tractor at the rear of which is connected a harvester thresher 11 by means of a triangular hitch frame 12. The harvester thresher is shown more completely in patent to Lindgren et al. 2,142,587, January 3, 1939. For the purposes of the present invention, it is sufficient to state that the harvester thresher is composed of a harvester platform 13, a longitudinally extending thresher body 14 and a transverse axle 15 supported at its ends on wheels 16 of which only one is shown.

A pick-up baler 17 is positioned at the rear of a harvester thresher. This baler is shown more completely in pending applications of Clemma R. Raney, Serial No. 233,998, filed October 8, 1938, and Russel R. Raney, Serial No. 243,412, filed December 1, 1938. For the purpose of the present invention it is sufficient to state that the pick-up baler includes a pick-up device 18 which is positioned directly behind the thresher body 14 so as to pick up straw discharged from the thresher body. Brace members 19 and 20 are connected at spaced points to the axle 15 of the harvester thresher and are also connected to one another at a point to the rear of the axle, and the member 20 is connected by means of a pin 21 to a hitch 22. This hitch is formed of two sections 23 and 24 extending in longitudinal alignment with one another. The section 23 is connected to the members 19 and 20 by means of straps 25 and the pin 21. The section 24 is connected to a pivoted front truck 27 at the front of the pick-up baler. The sections 23 and 24 of the hitch are connected to one another by means of pairs of straps 28 and 29 and a pin 30 so as to have pivotal movement with respect to one another in a vertical plane. Brackets 31 and 32 are secured to the top sides of the sections 23 and 24, respectively. A bolt 33 is pivotally connected by a pin 34 to the bracket 31 and extends through the bracket 32. Nuts 35 threaded on the end of the bolt 34 engage the rear side of the bracket 32 so as to limit the movement of the brackets 31 and 32 away from one another and thereby prevent, from the inline position of Figure 3, any pivotal movement of the sections 23 and 24 which involves upward movement of the pivot point; that is, the pin 30. A coil spring 36 surrounds the bolt 33 and resists but does not prevent pivotal movement of the sections 23 and 24 which involves a downward movement of the pivot point.

Figure 2 shows that the hitch 22 is connected by the pin 21 to the harvester thresher at a point forward of and higher than the lower end of a grain elevator 37 extending along the side of the thresher 14. In order that the hitch 22 may not strike the grain elevator 37 when the hitch extends as shown in the dotted line position of Figure 1, during turning of the harvester thresher and the pick-up baler, a guard 38 has been provided. This guard is secured to the under side of the thresher 14 adjacent the lower end of the grain elevator 37 and has a part lower than the lower end of the elevator although not beneath it, as shown in Figures 2 and 4. The guard 38 has a sloping portion 39 which extends somewhat to the rear of the grain elevator 37. During turning of the harvester thresher and the pick-up baler, the hitch 22 moves from the full line position of Figure 1 to the dotted line position. During this movement it encounters the sloping portion 39 of the guard 38 and is thereby caused to be depressed and finally to extend beneath the guard 38 as shown in Figure 4. The spring 36 yields sufficiently to allow pivot point of the sections 23 and 24 to move downwardly so that the sections 23 of the hitch may pass beneath the guard 38. In normal operation during which crops are cut and threshed by the harvester thresher 11, and crop material discharged from the rear of the thresher body 14 is picked up by the pick-up device 18, the hitch extends directly to the rear as shown in Figures 1 and 2, and the sections 23 and 24 of the hitch are maintained in a straight horizontal line, since the spring 36 is strong enough to resist downward movement of the pivot point of the sections due to weight of the sections and yet will yield sufficiently to allow the sections 23 to pass beneath the guard 38.

It will be seen from the foregoing description that a new and novel hitch for implements has been provided. The hitch is composed of sections connected so as to extend in a straight horizontal line during usage and yet the sections may pivot with one another sufficiently to allow the hitch to clear portions of the one implement during turning of the implements. The hitch has been illustrated for use with a harvester thresher and a pick-up baler, but it is obvious that it may be used for connecting other implements.

The intention is to limit the invention only within the terms of the appended claims.

What is claimed is:

1. In combination, a first implement, a second implement positioned behind the first implement, and means connecting the second implement and a part of the first implement forward of and higher than another part of the first implement and comprising a pair of elements connected to one another in alignment for relative pivotal movement in a vertical plane, and resilient means resisting pivotal movement between the elements involving a vertical movement of the pivot point, whereby during turning of the implements, the elements forming the connecting means may pass beneath the said other part of the first implement, pivotal movement between the elements taking place and involving a downward movement of the pivot point against the resilient means.

2. In combination, a first implement, a second implement positioned behind the first implement, and means connecting the second implement and a part of the first implement forward of and higher than another part of the first implement and comprising a pair of elements connected to one another in alignment for relative pivotal movement in a vertical plane, means preventing pivotal movement between the element involving an upward movement of the pivot point, and resilient means resisting pivotal movement between the elements involving a downward movement of the pivot point, whereby during turning of the implements the elements forming the connecting means may pass beneath the said other part of the first implement, pivotal movement between the elements taking place and involving a downward movement of the pivot point against the resilient means.

3. In combination, a harvester thresher, a pick-up baler positioned therebehind so as to pick up straw deposited upon the ground by the harvester thresher, and means connecting the pick-up baler and a part on the harvester thresher forward of and higher than another part and comprising a pair of elements connected to one another in longitudinal alignment for pivoting in a vertical plane, and resilient means resisting pivotal movement between the elements involving a vertical movement of the pivot point, whereby during turning of the harvester thresher and the pick-up baler the elements forming the connecting means may pass beneath the said other part of the harvester thresher, pivotal movement between the elements taking place and involving a downward movement of the pivot point against the resilient means.

4. In combination, a harvester thresher, a pick-up baler positioned therebehind so as to pick up straw deposited upon the ground by the harvester thresher, and means connecting the pick-up baler and a part on the harvester thresher forward of and higher than another part and comprising a pair of elements connected to one another in longitudinal alignment for pivoting in a vertical plane, means preventing pivotal movement between the elements involving an upward movement of the pivot point, and resilient means resisting pivotal movement between the elements involving a downward movement of the pivot point, whereby during turning of the harvester thresher and the pick-up baler the elements forming the connecting means may pass beneath the said other part of the harvester thresher, pivotal movement between the elements taking place and involving a downward movement of the pivot point against the resilient means.

5. In combination, a harvester thresher including an axle and an operative member positioned rearward and lower than the axle, and a pick-up baler positioned rearward of the harvester thresher so as to pick up straw discharged thereby, and hitch means connecting the harvester thresher and the pick-up baler and comprising a part secured to the rear of the axle, a first element pivotally connected to a point on the part higher than and forward of the lowermost point on the said operative member, a second element connected to the pick-up baler and to the first element for relative pivotal movement in a vertical plane, and resilient means resisting relative pivotal movement of the elements involving a vertical movement of the pivot point, whereby during turning of the harvester thresher and the pick-up baler the elements pivot about the part secured to the axle so as to pass beneath the said operative member of the harvester thresher, relative pivotal movement of the elements taking place and involving downward movement of the pivotal point against the resilient means.

6. In combination, a harvester thresher including a grain elevator, a guard adjacent the grain elevator and lower than the lower end thereof, and an axle, a pick-up baler positioned behind the harvester thresher so as to pick up straw discharged by the harvester thresher, and hitch means connecting the pick-up baler to the harvester thresher and comprising a member secured to the rear of the axle, a first element pivotally connected to the member, a second element connected to the pick-up baler and to the first element for pivotal movement with respect to the first element in a vertical plane, and resilient means resisting relative pivotal movement of the elements involving vertical movement of the pivot points, whereby upon turning of the harvester thresher and the pick-up baler the elements pivot about the member secured to the axle of the harvester thresher so as to pass beneath the grain elevator and in contact with the guard, relative pivotal movement between the elements taking place and involving downward movement of the pivot point against the resilient means.

7. In combination, a harvester thresher having a thresher body, a grain elevator at the side thereof, and a deflector secured beneath the body and lower than the lower end of the grain elevator, a pick-up baler positioned behind the harvester thresher so as to pick up straw discharged by the harvester thresher, and hitch means connecting the pick-up baler to a point of the harvester thresher spaced from and on the same side of the thresher body as the grain elevator and forward of and higher than the lower end of the grain elevator and comprising elements connected to one another for relative pivotal movement in a vertical plane, means preventing relative pivotal movement of the elements involving upward movement of the pivotal point, and resilient means resisting relative pivotal movement of the elements involving downward movement of the pivot point whereby upon turning of the harvester thresher and the pick-up baler the hitch means pivots about its point of connection with the harvester thresher so as to be deflected beneath the grain elevator by contact with the deflector, relative pivotal movement between the elements taking place and involving downward movement of the pivot point against the action of the resilient means.

8. In the combination specified in claim 7, the deflector having on its under side a surface sloping downwardly in a direction toward the front of the harvester thresher.

ARNOLD E. W. JOHNSON.
CHARLES F. CRUMB, Sr.